United States Patent [19]
Sato et al.

[11] Patent Number: 5,102,159
[45] Date of Patent: Apr. 7, 1992

[54] SUSPENSION SYSTEM FOR AUTOMOTIVE VEHICLE WHEEL

[75] Inventors: Masaharu Sato, Naka; Naoto Fukushima, Kamakura, both of Japan

[73] Assignee: Nissan Motor Co., Ltd., Yokohama, Japan

[21] Appl. No.: 676,112

[22] Filed: Mar. 27, 1991

[30] Foreign Application Priority Data

Mar. 29, 1990 [JP] Japan ................................ 2-78614

[51] Int. Cl.⁵ ............................................... B60G 3/20
[52] U.S. Cl. .................................... 280/663; 280/675; 280/690; 280/691
[58] Field of Search ............. 280/691, 695, 696, 700, 280/701, 724, 725, 726, 660, 663, 668, 673, 675, 96.1, 688

[56] References Cited

U.S. PATENT DOCUMENTS

| | | | |
|---|---|---|---|
| 4,556,238 | 12/1985 | Matschinsky | 280/701 |
| 4,591,184 | 5/1986 | Matschinsky | 280/675 |
| 4,664,412 | 5/1987 | Matschinsky | 280/701 |
| 4,842,296 | 6/1989 | Kubo | 280/663 |
| 4,863,188 | 9/1989 | Killian | 280/675 |

FOREIGN PATENT DOCUMENTS

| | | | |
|---|---|---|---|
| 0141092 | 5/1985 | European Pat. Off. | |
| 2587655 | 3/1987 | France | 280/668 |
| 278410 | 12/1986 | Japan | 280/668 |
| 1588760 | 4/1981 | United Kingdom | |

Primary Examiner—Charles A. Marmor
Assistant Examiner—Tamara L. Finlay
Attorney, Agent, or Firm—Foley & Lardner

[57] ABSTRACT

A double-wishbone type suspension system includes a hub carrier for supporting an automobile wheel, upper and lower link devices for rotatably connecting upper and lower ends of the hub carrier to a vehicle body, respectively, and a wind-up link element for connecting a middle portion of the hub carrier between the upper and lower ends to the lower link device. The wind-up link element is arranged diagonally with reference to the longitudinal direction of the vehicle, and rotatably connected to the hub carrier at a connecting point where the hub carrier is permitted to rotate in a direction of toe angle variation. This connecting point is used as a kingpin axis setting point whose location can be relatively freely determined to satisfy requirements imposed on the suspension system, due to a relatively high degree of freedom in designing the configuration of the hub carrier.

24 Claims, 5 Drawing Sheets

FIG_1

Front

FIG_2

FIG_3

FIG_4

FIG_5

FIG_6

FIG_7

FIG_8

SUSPENSION SYSTEM FOR AUTOMOTIVE VEHICLE WHEEL

BACKGROUND OF THE INVENTION

1. Field of the Invention

The present invention relates to a double-wishbone type suspension system for an automotive vehicle wheel.

2. Description of the Related Art

This type of suspension system includes a hub carrier for supporting a wheel, whose upper and lower ends are rotatably connected to a vehicle body with upper and lower link devices, respectively. There are known various kinds of double-wishbone type suspension systems which are classified according to the manner of supporting the upper and lower link devices in the longitudinal direction of the vehicle body. One example of such a suspension system is disclosed in U.S. Pat. No. 4,556,238 or DE-A-3331247, which will be briefly explained below.

Figure 9:
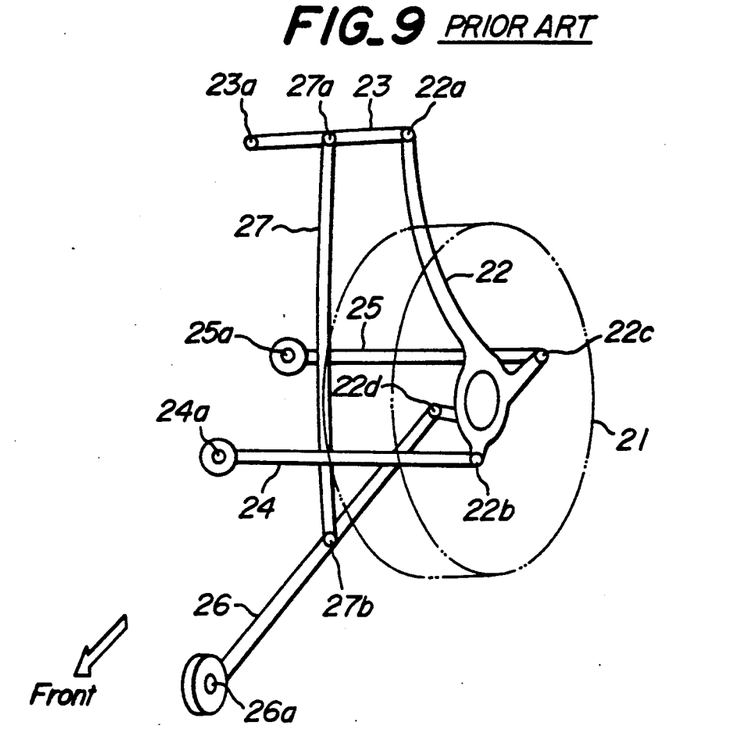
FIGS. 9 and 10 are respectively a perspective view and front view of the conventional suspension system described above.
Figure 10:
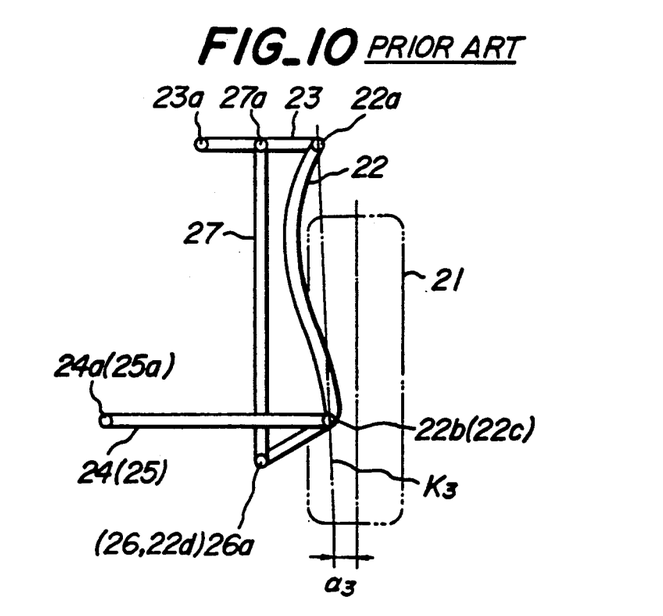

Referring to FIGS. 9 and 10, the known suspension system described above includes a hub carrier 22 for supporting the wheel 21, with its upper end 22a rotatably connected to a vehicle body at a predetermined position 23a through an upper link element 23. The hub carrier 22 has lower ends 22b, 22c which are rotatably connected to the vehicle body at predetermined points 24a, 25a through lower link elements 24, 25, respectively. These lower link elements 24, 25 form a lower link device together with a radius rod 26 which extends forwardly from a lower end 22d of the hub carrier 22. The radius rod 26 is connected to the vehicle body at a point 26a to support the lower link device in the longitudinal direction of the vehicle body. On the other hand, the middle portion of the upper link element 23 and the middle portion of the radius rod 26 are connected to each other by an integral link element 27 at positions 27a, 27b, to support the upper link element 23 in the longitudinal direction of the vehicle body and provide the suspension system with a wind-up stiffness.

However, in the case of the suspension system described above, the kingpin axis K$_3$ passes through the connecting point 22a between the upper link element 23 and the hub carrier 22, as illustrated in FIG. 10. The position of the connecting point 22a itself is significantly restricted in view of limited installation space for the suspension device and the requirement to preserve a necessary suspension stroke, so that the degree of freedom in designing the setting of the kingpin axis K$_3$ is extremely limited.

For example, the length of the upper link element 23 can not be shortened too much because the required suspension stroke has to be maintained, therefore the connecting point 22a is necessarily located at a position which is relatively outside of the vehicle body in its lateral direction. Therefore, the kingpin axis K$_3$ passing through the connecting point 22a and the kingpin axis setting point of the lower link system tend to be oriented vertically. Accordingly, the point where the kingpin axis K$_3$ intersects the outer circumferential surface of the wheel tends to be located relatively inside of the ground contact center of the wheel in the lateral direction of the vehicle body, generating a kingpin offset $a_3$ on the positive side.

On the contrary, in the case of a rear wheel suspension system, it is generally desirable for the kingpin offset to be generated on the negative side so that the toe angle variation caused by the braking force can be generated toward the toe-in direction to improve the stability of the vehicle. In the case of a front wheel suspension system, on the other hand, it is generally desirable for the kingpin offset amount to be substantially zero in order to prevent variation of steering reaction force during braking operation. The conventional suspension system, accompanied by a tendency of kingpin offset generation on the positive side as explained above, has difficulty to satisfactorily meeting the requirements imposed on both the front and rear wheel suspension systems, that is, that the kingpin offset not be generated on the positive side.

Furthermore, regarding the toe angle variation caused by the side force during turning of the vehicle, it is preferable for safety reasons that the kingpin axis provides a negative trail for a rear wheel, and a positive trail for a front wheel. Therefore, the variation of toe angle can be generated on the understeering side, that is, toe-in side for a rear wheel and toe-out side for a front wheel. However, for a conventional suspension system, to satisfy these conditions, there has been no alternative other than shifting the position of the upper link element either forwardly or rearwardly with reference to the longitudinal direction of the vehicle body.

SUMMARY OF THE INVENTION

It is therefore an object of the present invention to eliminate the problems mentioned above, and provide a novel suspension system with a link structure which allows the kingpin axis setting point to be located with a higher degree of design freedom.

To this end, the present invention provides a double-wishbone type suspension system which comprises: a hub carrier for supporting a wheel, said hub carrier having upper and lower ends and a middle portion between said upper and lower ends; upper and lower link devices for rotatably connecting said upper and lower ends of the hub carrier to a vehicle body, respectively; and a wind-up link element arranged diagonally with reference to a longitudinal direction of the vehicle body, for connecting said middle portion of the hub carrier to said lower link device, said wind-up link element being rotatably connected to said hub carrier at a connecting point where the hub carrier is permitted to rotate in a direction of to angle variation.

With the suspension system according to the present invention, the bound and rebound of the wheel can be absorbed by the oscillation of the upper and lower link devices connecting the hub carrier to the vehicle body. Meanwhile, the wind-up link element, arranged diagonally with reference to the longitudinal direction of the vehicle and disposed between the middle portion of the hub carrier and the lower link device, is capable of supporting the upper link element in the longitudinal direction to afford a required wind-up stiffness.

The present invention is based on a recognition of a relatively high degree of freedom in designing the configuration of the hub carrier, and locates the kingpin axis setting point on the hub carrier, rather than the connecting point between the upper link element and the hub carrier as was the case in the prior art arrangement mentioned hereinbefore.

More particularly, according to the present invention, the connecting point between the wind-up link element and the hub carrier is made as a link structure which allows the rotation of the hub carrier in the toe direction. This connecting point is used as a kingpin axis setting point, and lies on the hub carrier with a relatively high degree of design freedom as mentioned above. Consequently, the present invention makes it possible to improve the degree of design freedom for the kingpin axis and satisfy various requirements imposed on the suspension system as described above.

According to one preferred embodiment of the present invention, the suspension system is for a rear wheel, and the connecting point between the wind-up link element and the hub carrier is located such that a line passing through said connecting point and a flexural center of the lower link device intersects the outer circumference of the wheel outside of a ground contact center of the wheel in the lateral direction of the vehicle body. Such an arrangement provides a kingpin offset in the negative direction so that a braking force serves to generate a toe-in tendency. The toe-in tendency is particularly advantageous in a rear wheel suspension system to improve stability during a braking operation.

The connecting point between the wind-up link element and the hub carrier may be located such that a line passing through said connecting point and a flexural center of the lower link device intersects a ground surface on a rear side of the ground contact center of the wheel in the longitudinal direction of the vehicle body. In this case, it is possible to set a negative trail so that a side force provides a toe-in tendency which is also advantageous in a rear wheel suspension system for improving stability with an understeering tendency during the turning of the vehicle.

According to another preferred embodiment of the present invention, the suspension system is for a front wheel, and the connecting point between the wind-up link element and the hub carrier is located such that a line passing through said connecting point and a steering center of the lower link device intersects the outer circumference of the wheel in a plane which is perpendicular to the rotational axis of the wheel and which passes through the ground contact center of the wheel. Such an arrangement provides a minimized kingpin offset amount which is particularly advantageous in a front wheel suspension device because it minimizes the variation of the steering reaction force caused by the braking or driving force applied to the wheel, thereby improving the steering stability.

The connecting point between the wind-up link element and the hub carrier may be located such that a line passing through said connecting point and the steering center of the lower link device intersects a ground surface on a front side of the ground contact center of the wheel in the longitudinal direction of the body. In this case, it is possible to set a positive trail so that a side force provides a toe-out tendency, which is also advantageous in a front wheel suspension device to for improving stability with an understeering tendency during the turning of the vehicle.

According to a further advantageous embodiment of the present invention, the lower link device is composed as a link structure including a radius rod which is arranged in the longitudinal direction of the vehicle body, and the wind-up link element is provided between the radius rod and the hub carrier. The radius rod may have a front end pivotally connected to the vehicle body through an elastic bush for supporting the lower link device in the longitudinal direction of the vehicle body. The elastic bush at the front end of the radius rod may be made relatively elastic with regard to the longitudinal direction of the vehicle body to improve the ride-harshness characteristics, while it is made relatively stiff with regard to the vertical direction.

DETAILED EXPLANATION OF THE PREFERRED EMBODIMENTS

The present invention will now be described in further detail, by referring to certain preferred embodiments shown in the accompanying drawings.

There is shown in FIGS. 1 to 4 one embodiment of the invention which is applied to a rear wheel suspension system for an automotive vehicle including a rear wheel 1. The suspension system includes a hub carrier 2 for rotatably supporting the wheel 1, having an upper end A which is connected by a ball joint to an upper link device in the form of a link element 3. The upper link element 3 has a base end B which, in turn, is connected to a vehicle body (not shown) by another ball joint. Therefore, the hub carrier 2 is connected to the vehicle body through the upper link element 3 at its upper end A in an omnidirectionally oscillatable manner.

The lower end of the hub carrier 2 is connected at points C, D to lower link elements 4, 5 through ball joints, respectively, lower link elements 4, 5 have their base ends E, F pivotally connected to the vehicle body through elastic bushes, respectively, so that the lower link elements 4, 5 can be oscillated vertically. A lower link device 6 is composed of the link elements 4, 5 and a radius rod 7 which is connected to the middle portion of the lower link element 5 at a point G through a ball joint. The radius rod 7 extends from its rear end at the point G forwardly in the longitudinal direction of the vehicle body, and to terminates at its front end H which is pivotally connected to the vehicle body through an elastic bush so that the radius rod 7 can be oscillated vertically. In the way described above, the radius rod 7 serves to support the lower link elements 4, 5 in the longitudinal direction of the vehicle body. In this connection, the elastic bush at the front end H is made relatively elastic with regard to the longitudinal direction of the vehicle body to improve the ride-harshness characteristics, and is made relatively stiff with regard to the vertical direction.

In order to ensure a sufficient wind-up stiffness for supporting the upper link element 3 in the longitudinal direction, a wind-up link element 8 is diagonally arranged with reference to the longitudinal direction of the vehicle body. Element 8 is arranged between a middle point I of the hub carrier 2 and a middle point J of the radius rod 7. Both ends of the wind-up link element 8 are rotatably connected to the hub carrier 2 and the radius rod 7 at the connecting points I and J through ball joints, respectively. Due to the provision of the ball joint at the connecting point I between the hub carrier 2 and the wind-up link element 8, and of the upper link element 3 which can be oscillated an omnidirectional sense, the connecting portion I forms a link structure which allows rotation of the hub carrier 2 about the connecting point I also in the toe direction.

In the manner described above, the connecting point I can be utilized as a kingpin axis setting point. It should be noted that a flexural center X is determined by the elastic bushes at the end points E, F and H of the lower link device 6. A line passing through the point I and the flexural center X of the lower link device 6 becomes the kingpin axis $K_1$. The hub carrier 2 has a relatively high degree of freedom in designing its configuration, so that it is possible to relatively freely select the position of the kingpin axis setting point I over a wide range.

Figure 1:
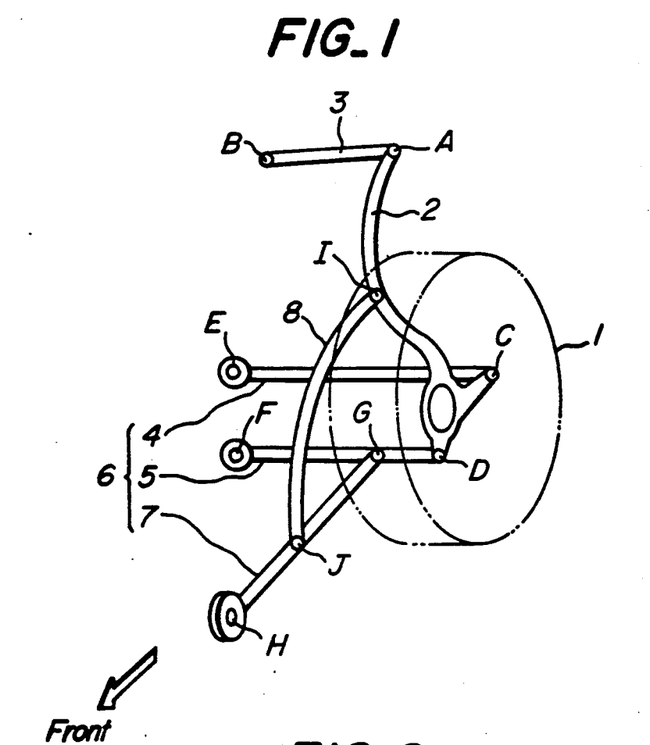
FIGS. 1 to 4 are respectively a perspective view, front view, side view and plan view showing the rear wheel suspension system according to one embodiment of the present invention.
Figure 2:
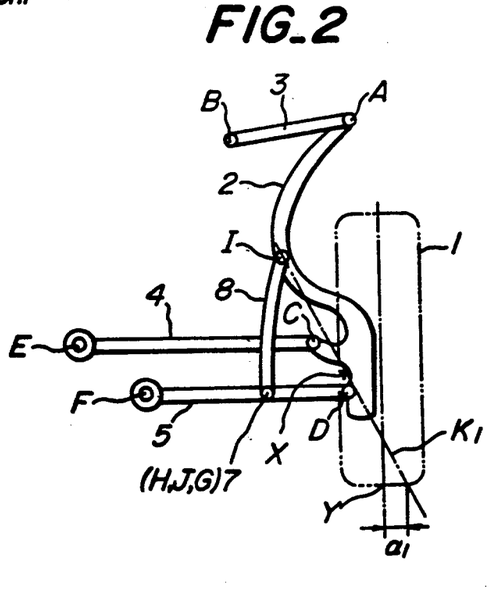

Accordingly, in the case of the rear wheel suspension system of this embodiment, the kingpin axis $K_1$ can be set so as to provide a negative offset as shown at $\alpha_1$ in FIG. 2. In other words, the kingpin axis $K_1$ can be set such that the intersection of the kingpin axis $K_1$ and the circumferential surface of the rear wheel 1 is outside of the ground contact center Y of the rear wheel in the lateral direction of the vehicle body. In this case, a rear wheel braking force acting upon the ground contact center Y vertically to the drawing sheet of FIG. 2 varies the toe angle about the kingpin axis $K_1$ in the toe-in direction, thereby providing a stabilized behavior of the vehicle during a braking operation.

Figure 3:
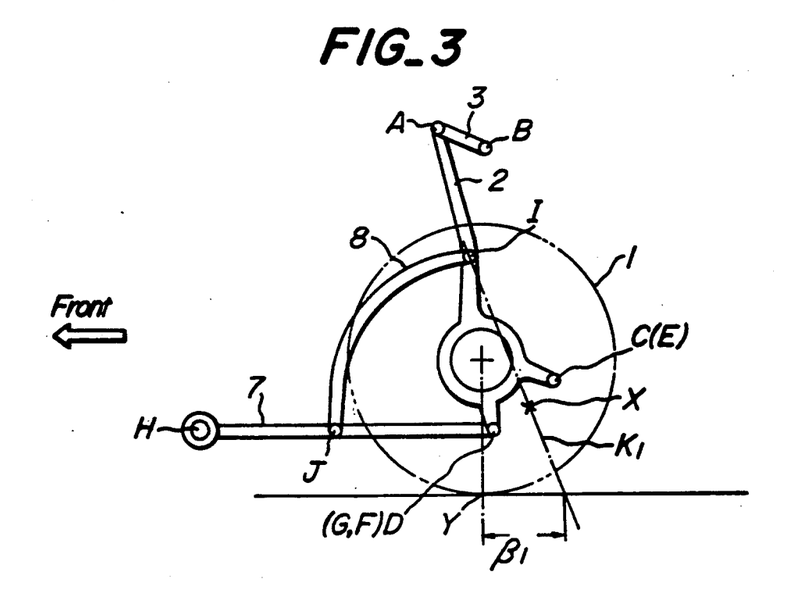
Figure 4:
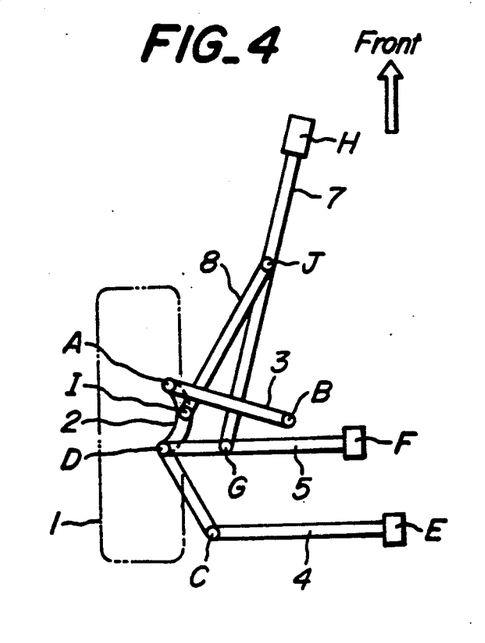
Figure 5:
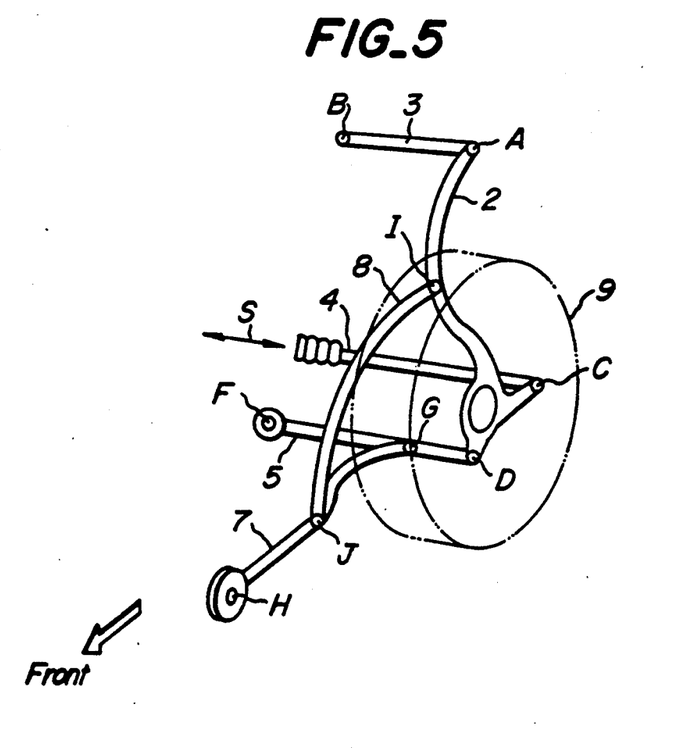
FIGS. 5 to 8 are respectively a perspective view, front view, side view and plan view, similar to FIGS. 1 to 4, respectively, showing the front wheel suspension system according to another embodiment of the present invention.

As illustrated in FIG. 3, furthermore, the kingpin axis $K_1$ can be set so as to provide a negative trail as shown at $\beta_1$; in other words, the kingpin axis $K_1$ can be set such that it intersects the ground surface on the rear side of the vehicle body with respect to the ground contact center Y of the rear wheel 1. In this case, it should be noted that a side force acts upon the ground contact center Y vertically to the drawing sheet of FIG. 3 during turning of the vehicle. This side force changes the toe angle of the rear wheel 1 in the toe-in direction about the kingpin axis $K_1$. Consequently, the turning stability of the vehicle can be improved due to an understeering tendency. The understeering tendency can be further enhanced by increasing the modulus of elasticity of the elastic bush at the point E with regard to the lateral direction of the vehicle, as compared with that of the elastic bush at the point F.

Furthermore, in the case of the illustrated rear wheel suspension system, the upper link element 3 upon bounding of the rear wheel 1 is oscillated about the base end B not only in the vertical direction, but also forwardly in the longitudinal direction so that the upper end A of the hub carrier 2 can be pulled inwardly of the vehicle body. Consequently, it is possible to increase the negative camber of the rear wheel located on the outer side with reference to the turning center point, to provide an improved turning performance of the vehicle.

Figure 6:
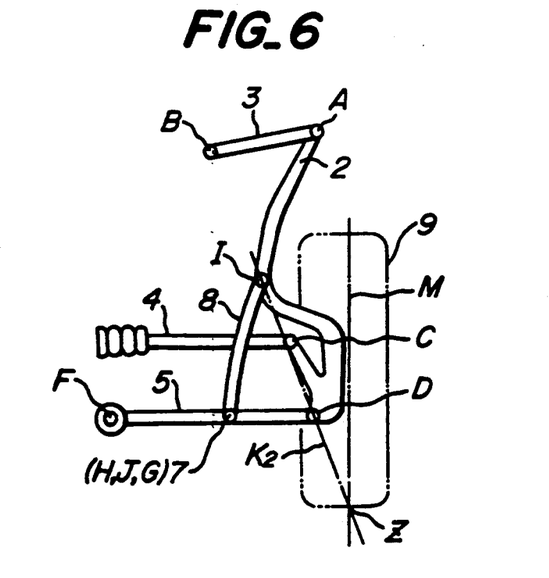
Figure 7:
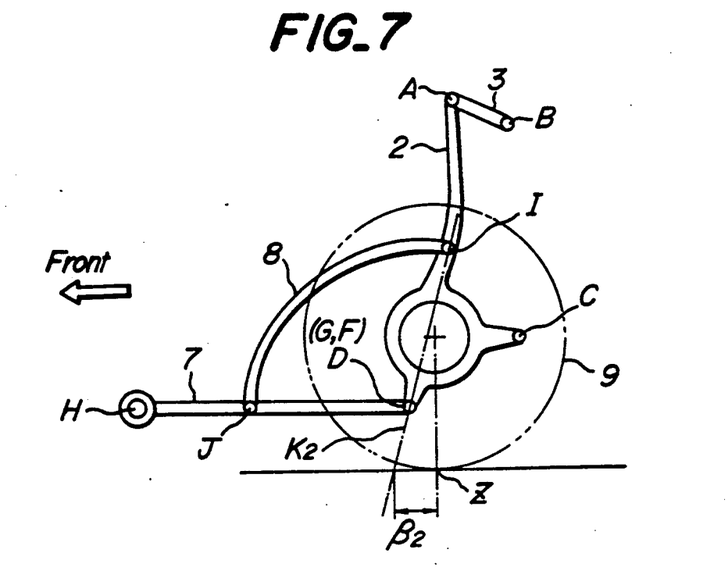
Figure 8:
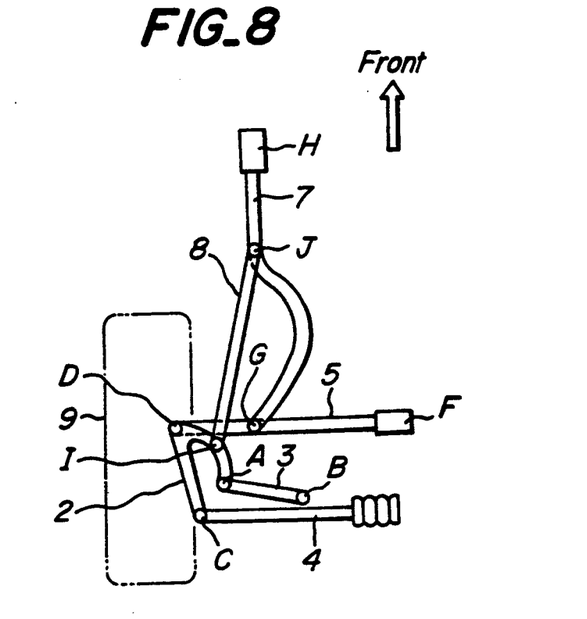

There is shown in FIGS. 5 to 8 another embodiment of the present invention for a suspension system of a front wheel 9 which is steered by a steering force S as applied to the lower link element 4 on the rear side. This embodiment is essentially the same in structure as the rear suspension system described above with reference to FIGS. 1 to 4. However, the front wheel system differs from the rear wheel system in that, due to the application of a front wheel steering force S to the lower link element 4, the kingpin axis $K_2$ is a line passing through the connecting point I between the wind-up link element 8 and the middle portion of the hub carrier 2, and also passing through a steering center D of the lower link device as illustrated in FIG. 6 and FIG. 7.

In this embodiment, the connecting point I is determined such that the kingpin axis $K_2$ intersects the outer circumferential surface of the front wheel in a plane M which is perpendicular to the rotational axis of the front wheel 9 and which passes through the ground contact center Z of the front wheel 9, thereby making the kingpin offset amount zero. In this case, even when the front wheel 9 is acted upon by braking or driving force at the ground contact center Z vertically to the drawing sheet of FIG. 6, no moment is generated which tends to change the toe angle of the front wheel 9 about the kingpin axis $K_2$. It is thus possible to prevent variation of the steering reaction force in the braking or driving state of the vehicle.

The connecting point I is determined so that the kingpin axis $K_2$ can be located such that a positive trail is obtained as illustrated by $\beta_2$ in FIG. 7. In other words, the kingpin axis $K_2$ intersects the ground surface on the front side of the vehicle body with respect to the ground contact center Z of the front wheel 9. In this case, a side force is generated when the vehicle is turned, and acts upon the ground contact point Z in FIG. 7 vertically to the drawing sheet, to change the toe-angle of the front wheel 9 about the kingpin axis $K_2$ in the toe-out direction, and thereby provide an improved turning stability due to understeering tendency.

Furthermore, the front wheel suspension system of the embodiment described above makes it possible to increase the negative camber of the front wheel located on the outer side with reference to the turning center point during turning of the vehicle, thereby providing an improved turning performance, similar to the rear wheel suspension system illustrated in FIGS. 1 to 4.

As explained above, the suspension system according to the present invention is composed such that the middle portion of the hub carrier and the lower link device are connected by the wind-up link element which is diagonally arranged with reference to the longitudinal direction of the vehicle body. The wind-up link element and the hub carrier are connected with each other to form a link structure which allows the rotation of the hub carrier in the toe direction The connecting point of the wind-up link element to the hub carrier is used as the kingpin axis setting point. The hub carrier has a relatively high degree of freedom in designing its configuration, so that the position of the kingpin axis can be determined relatively freely.

What is claimed is:

1. A double-wishbone type suspension system for an automotive vehicle wheel, comprising:
   a hub carrier for supporting the wheel, said hub carrier having upper and lower ends and a middle portion between said upper and lower ends;
   upper and lower link devices for rotatably connecting said upper and lower ends of the hub carrier to a vehicle body, respectively; and
   a wind-up link element arranged diagonally with respect to a longitudinal direction of the vehicle body, for connecting said middle portion of the hub carrier to said lower link device, said wind-up link element being rotatably connected to said hub carrier at a connecting point where the hub carrier is permitted to rotate in a direction of toe angle variation of the wheel.

2. The suspension system as set forth in claim 1, wherein said system is for a rear wheel, and said connecting point between the wind-up link element and the hub carrier is located such that a line passing through said connecting point and a flexural center of said lower link device intersects an outer circumference of the wheel on the outside of a ground contact center of the wheel in the lateral direction of the vehicle body.

3. The suspension system as set forth in claim 2, wherein said connecting point between the wind-up link element and the hub carrier is located such that said line intersects a ground surface on a rear side of said ground contact center of the wheel in the longitudinal direction of the vehicle body.

4. The suspension system as set forth in claim 2, wherein said lower link device is comprises a link structure including a radius rod which is located in the longitudinal direction of the vehicle body, and wherein said wind-up link element is provided between said radius rod and the hub carrier.

5. The suspension system as set forth in claim 2, wherein said connecting point between the wind-up link element and the hub carrier is located such that said line intersects a ground surface on a rear side of said ground contact center of the wheel in the longitudinal direction of the vehicle body, and wherein said lower link device comprises a link structure including a radius rod which is located in the longitudinal direction of the vehicle body, and said wind-up link element is provided between said radius rod and the hub carrier.

6. The suspension system as set forth in claim 1, wherein said connecting point between the wind-up link element and the hub carrier is located such that a line passing through said connecting point and a flexural center of the lower link device intersects a ground surface on a rear side of a ground contact center of the wheel in the longitudinal direction of the vehicle body.

7. The suspension system as set forth in claim 6, wherein said system is for a rear wheel, and said connecting point between the wind-up link element and the hub carrier is located such that said line intersects an outer circumference of the wheel on the outside of said ground contact center of the wheel in the lateral direction of the vehicle body.

8. The suspension system as set forth in claim 6, wherein said lower link device comprises a link structure including a radius rod which is located in the longitudinal direction of the vehicle body, and wherein said wind-up link element is provided between said radius rod and the hub carrier.

9. The suspension system as set forth in claim 6, wherein said system is for a rear wheel, and said connecting point between the wind-up link element and the hub carrier is located such that said line intersects an outer circumference of the wheel on the outside of said ground contact center of the wheel in the lateral direction of the vehicle body, and wherein said lower link device is comprises a link structure including a radius rod which is located in the longitudinal direction of the vehicle body, and said wind-up link element is provided between said radius rod and the hub carrier.

10. The suspension system as set forth in claim 1, wherein said system is for a front wheel, and said connecting point between the wind-up link element and the hub carrier is located such that a line passing through said connecting point and a steering center of the lower link device intersects an outer circumference of the wheel in a plane which is perpendicular to a center axis of an axle for said wheel and which passes through a ground contact center of the wheel.

11. The suspension system as set forth in claim 10, wherein said connecting point between the wind-up link element and the hub carrier is located such that said line intersects a ground surface on a front side of a ground contact center of the wheel in the longitudinal direction of the vehicle body.

12. The suspension system as set forth in claim 10, wherein said lower link device comprises a link structure including a radius rod which is located in the longitudinal direction of the vehicle body, and wherein said wind-up link element is provided between said radius rod and the hub carrier.

13. The suspension system as set forth in claim 10, wherein said connecting point between the wind-up link element and the hub carrier is located such that said line intersects a ground surface on a front side of said ground contact center of the wheel in the longitudinal direction of the body, and wherein said lower link device comprises a link structure including a radius rod which is located in the longitudinal direction of the vehicle body, and said wind-up link element is provided between said radius rod and the hub carrier.

14. The suspension system as set forth in claim 1, wherein said connecting point between the wind-up link element and the hub carrier is located such that a line passing through said connecting point and a steering center of the lower link device intersects a ground surface on a front side of a ground contact center of the wheel in the longitudinal direction of the vehicle body.

15. The suspension system as set forth in claim 14, wherein said system is for a front wheel, and said connecting point between the wind-up link element and the hub carrier is located such that said line intersects an outer circumference of the wheel in a plane which is perpendicular to a center axis of an axle for said wheel and which passes through said ground contact center of the wheel.

16. The suspension system as set forth in claim 14, wherein said lower link device comprises a link structure including a radius rod which is located in the longitudinal direction of the vehicle body, and wherein said wind-up link element is provided between said radius rod and the hub carrier.

17. The suspension system as set forth in claim 14, wherein said system is for a front wheel, and said connecting point between the wind-up link element and the hub carrier is located such that said line intersects an outer circumference of the wheel in a plane which is perpendicular to a center axis of an axle for said wheel and which passes through a ground contact center of the wheel, and wherein said lower link device comprises a link structure including a radius rod which is located in the longitudinal direction of the vehicle body, and said wind-up link element is provided between said radius rod and the hub carrier.

18. The suspension system as set forth in claim 1, wherein said lower link device comprises a link structure including a radius rod which is located in the longitudinal direction of the vehicle body, and wherein said wind-up link element is provided between said radius rod and the hub carrier.

19. The suspension system as set forth in claim 18, wherein said system is for a rear wheel, and said connecting point between the wind-up link element and the hub carrier is located such that a line passing through said connecting point and a flexural center of said lower link device intersects an outer circumference of the wheel on the outside of a ground contact center of the wheel in the lateral direction of the vehicle body.

20. The suspension system as set forth in claim 18, wherein said connecting point between the wind-up link element and the hub carrier is located such that a line passing through said connecting point and a flexural center of the lower link device intersects a ground surface on a rear side of a ground contact center of the wheel in the longitudinal direction of the vehicle body.

21. The suspension system as set forth in claim 18, wherein said system is for a rear wheel, and said connecting point between the wind-up link element and the hub carrier is located such that a line passing through said connecting point and a flexural center of said lower link device intersects an outer circumference of the wheel on the outside of a ground contact center of the wheel in the lateral direction of the vehicle body, and intersects a ground surface on a rear side of said ground contact center in the longitudinal direction of the vehicle body.

22. The suspension system as set forth in claim 18, wherein said system is for a front wheel, and said connecting point between the wind-up link element and the hub carrier is located such that a line passing through said connecting point and a steering center of the lower link device intersects an outer circumference of the wheel in a plane which is perpendicular to a center axis of an axle for said wheel and which passes through a ground contact center of the wheel.

23. The suspension system as set forth in claim 18, wherein said system is for a front wheel, and said connecting point between the wind-up link element and the hub carrier is located such that a line passing through said connecting point and a steering center of the lower link device intersects a ground surface on a front side of a ground contact center of the wheel in the longitudinal direction of the body.

24. The suspension system as set forth in claim 18, wherein said system is for a front wheel, and said connecting point between the wind-up link element and the hub carrier is located such that a line passing through said connecting point and a steering center of the lower link device intersects an outer circumference of the wheel in a plane which is perpendicular to a center axis of an axle for said wheel and which passes through a ground contact center of the wheel, and intersects a ground surface on a front side of said ground contact center in the longitudinal direction of the body.

* * * * *